US011597506B2

(12) United States Patent
Clarke et al.

(10) Patent No.: US 11,597,506 B2
(45) Date of Patent: Mar. 7, 2023

(54) ROTOR HEAD FOR AERIAL VEHICLE

(71) Applicant: FT HOLDINGS INC., Calgary (CA)

(72) Inventors: Jason Peter Clarke, Calgary (CA); Daniel John Clarke, Calgary (CA)

(73) Assignee: FT HOLDINGS INC., Calgary (CA)

(*) Notice: Subject to any disclaimer, the term of this patent is extended or adjusted under 35 U.S.C. 154(b) by 190 days.

(21) Appl. No.: 16/837,509

(22) Filed: Apr. 1, 2020

(65) Prior Publication Data

US 2020/0317330 A1     Oct. 8, 2020

Related U.S. Application Data

(60) Provisional application No. 62/828,898, filed on Apr. 3, 2019.

(51) Int. Cl.

| | | |
|---|---|---|
| *B64C 27/605* | (2006.01) | |
| *B64C 27/10* | (2023.01) | |
| *B64C 27/625* | (2006.01) | |
| *B64D 27/24* | (2006.01) | |
| *B64C 27/32* | (2006.01) | |
| *B64C 27/80* | (2006.01) | |
| *B64C 39/02* | (2023.01) | |

(52) U.S. Cl.
CPC ............ *B64C 27/605* (2013.01); *B64C 27/10* (2013.01); *B64C 27/32* (2013.01); *B64C 27/625* (2013.01); *B64C 27/80* (2013.01); *B64D 27/24* (2013.01); *B64C 39/024* (2013.01)

(58) Field of Classification Search
None
See application file for complete search history.

(56) References Cited

U.S. PATENT DOCUMENTS

| | | | |
|---|---|---|---|
| 7,273,195 B1 | 9/2007 | Golliher | |
| 9,902,493 B2 | 2/2018 | Simon et al. | |
| 10,279,898 B2 * | 5/2019 | Green | B64D 27/02 |
| 10,618,641 B2 * | 4/2020 | Uebori | B64C 11/32 |
| 10,988,247 B2 * | 4/2021 | Iskrev | B64C 27/14 |
| 2007/0215750 A1 | 9/2007 | Shantz et al. | |
| 2009/0220341 A1 | 9/2009 | Schmaling | |
| 2013/0206915 A1 | 8/2013 | Desaulniers | |
| 2019/0047689 A1 * | 2/2019 | Muren | B64C 27/635 |

FOREIGN PATENT DOCUMENTS

| | | |
|---|---|---|
| CN | 103552686 A | 2/2014 |
| CN | 203666982 U | 6/2014 |
| CN | 204822069 U | 12/2015 |
| CN | 105366043 A | 3/2016 |
| WO | 89/07547 A1 | 8/1989 |
| WO | 2013/060693 A2 | 5/2013 |
| WO | 2016/132040 A1 | 8/2016 |

OTHER PUBLICATIONS

KR-101286232-B1 (Year: 2013).*
International Search Report Corresponding to PCT/CA2017/051458 dated Mar. 2, 2018.
Written Opinion Corresponding to PCT/CA2017/051458 dated Mar. 2, 2018.
Supplementary European Search Report issued in corresponding European Patent Application No. 17877729.8 dated Jul. 7, 2020.

* cited by examiner

*Primary Examiner* — Juan G Flores
(74) *Attorney, Agent, or Firm* — Finch & Maloney PLLC

(57) ABSTRACT

A rotor system for aerial vehicles where two or more rotor systems are used in a coaxial or tandem arrangement on the aerial vehicle.

12 Claims, 8 Drawing Sheets

ROTOR HEAD FOR AERIAL VEHICLE

CROSS-REFERENCE TO RELATED APPLICATIONS

This application claims priority of United States provisional patent application serial no. 62/828,898 filed 2 Apr. 2019, which is incorporated by reference into this application in its entirety.

TECHNICAL FIELD

The present disclosure is related to the field of aerial vehicles, in particular, rotor heads for aerial vehicles such as helicopters and unmanned aerial vehicles.

BACKGROUND

Unmanned aerial vehicles ("UAVs"), better known as drones, are one of the technological marvels of our age. They can document the aftermath of disasters without putting additional people at risk, and the corporate sector plan to use them for small package delivery in the not-too-distant future.

Large delivery and service companies have plans for turning drone technology into new sources of revenue. Amazon has announced its "Prime Air," a delivery system it says will eventually allow the company to "to safely get packages into customers' hands in 30 minutes or less" using small drones. In 2014, DHL Parcel announced the start of regular, autonomous drone flights to a sparsely inhabited German island in the North Sea for scheduled deliveries of medications and "other urgently needed goods" to the local community. Google also has a drone delivery service called Wing in the works. Providing a drone for logistics applications still requires overcoming the problems of being able to carry large payloads over large distances and/or being able to operate for extended periods of time. Drones that can carry small payloads can flown over longer distances than drones carrying larger payloads due to the drain on the batteries required for the additional power needed to lift the larger payloads.

Multi-copiers have largely become ubiquitous within the Unmanned Aerial Vehicle market, however, it is apparent that scaling multi-copter design up to carry higher payloads or increase endurance is prohibitively expensive and complex. As size and, therefore, inertia of the aerial vehicle increases, pitch, roll and yaw control of the aerial vehicle becomes much harder to accomplish by increasing and decreasing the motor speeds. Helicopter-design UAVs, therefore, offer superior performance for large unmanned systems. However, helicopter-design is necessarily more complex than design of multi-copiers.

It is, therefore, desirable to provide a simple, cost-effective rotor head design for incorporation into various helicopters including coaxial, traditional, tandem and synchropter helicopter designs.

SUMMARY

A novel rotor head design for aerial vehicles provided. In some embodiments, the rotor head design can comprise three main novel aspects:

First, in some embodiments, the rotor head can comprise a direct-drive motor, whereas traditional helicopters incorporate either a gear- or belt-drive system. The direct drive motor can comprise fewer moving parts and a more efficient drive-train having no transmission losses, reduced complexity, increased reliability and reduced cost.

Second, in some embodiments, the rotor head can comprise a swashplate synchronisation mechanism incorporated into the pitch driver links via a master-slave relationship. This arrangement can reduce part count and complexity, as well as increasing reliability.

Third, in some embodiments, the design can comprise a single direction cyclic and collective rotor head, which can reduce the cyclic direction to one direction only (pitch or roll). This can reduce the number of actuators required for cyclic and collective control of the swashplate from three to two. This feature can be especially useful when more than one rotor head is present on the aerial vehicle, such as in a coaxial or tandem helicopter. This can also reduce complexity and cost, as well as increasing reliability.

Broadly stated, in some embodiments, a rotor system can be provided for an aerial vehicle, comprising: a motor mount configured for attaching to the aerial vehicle; a motor stator operatively coupled to the motor mount; a motor rotor rotatably disposed within the motor stator; a spine shaft operatively coupled to the motor mount; a rotor hub operatively coupled to the motor rotor; at least two rotor blades rotatably coupled to the rotor hub, the at least two rotor blades disposed in a spaced-apart configuration about a circumference of the rotor hub, the at least two rotor blades operatively coupled to the rotor hub via a blade grip, the blade grip rotatably coupled to a feathering shaft extending from the rotor hub; at least one pitch servo motor disposed near one end of the spine shaft, the at least one pitch servo motor comprising a servo arm; and a swashplate mechanism operatively coupling the at least one pitch servo motor to the blade grip, wherein operation of the swashplate mechanism adjusts a pitch angle of the at least two rotor blades.

Broadly stated, in some embodiments, an aerial vehicle can be provided comprising at least two rotor systems, wherein each of the at least two rotor systems comprises: a motor mount configured for attaching to the aerial vehicle; a motor stator operatively coupled to the motor mount; a motor rotor rotatably disposed within the motor stator; a spine shaft operatively coupled to the motor mount; a rotor hub operatively coupled to the motor rotor; at least two rotor blades rotatably coupled to the rotor hub, the at least two rotor blades disposed in a spaced-apart configuration about a circumference of the rotor hub, the at least two rotor blades operatively coupled to the rotor hub via a blade grip, the blade grip rotatably coupled to a feathering shaft extending from the rotor hub; at least one pitch servo motor disposed near one end of the spine shaft, the at least one pitch servo motor comprising a servo arm; and a swashplate mechanism operatively coupling the at least one pitch servo motor to the blade grip, wherein operation of the swashplate mechanism adjusts a pitch angle of the at least two rotor blades.

Broadly stated, in some embodiments, wherein the swashplate mechanism can further comprise: a swashplate stator circumferentially disposed around the spine shaft; a swash link operatively coupling the servo arm to the swashplate stator; a swashplate rotor rotatably circumferentially disposed around the swashplate stator; and a master pitch link operatively coupling the swashplate rotor to the blade grip of a first rotor blade of the at least two rotor blades.

Broadly stated, in some embodiments, the swashplate mechanism can further comprise a slave pitch link operatively coupling the swashplate rotor to a second rotor blade of the at least two rotor blades.

Broadly stated, in some embodiments, the rotor system can further comprise a control unit configured for controlling the operation of the rotor system.

Broadly stated, in some embodiments, the aerial vehicle can further comprise a control unit configured for controlling the operation of each of the at least two rotor systems.

Broadly stated, in some embodiments, the at least two rotor systems can be configured in a coaxial or tandem arrangement on the aerial vehicle.

Broadly stated, in some embodiments, a method can be provided for manufacturing an aerial vehicle, the method comprising: mounting at least one rotor system on the aerial vehicle, wherein each of the at least one rotor system comprises: a motor mount configured for attaching to the aerial vehicle; a motor stator operatively coupled to the motor mount; a motor rotor rotatably disposed within the motor stator; a spine shaft operatively coupled to the motor mount; a rotor hub circumferentially disposed around the spine shaft; at least two rotor blades rotatably coupled to the rotor hub, the at least two rotor blades disposed in a spaced-apart configuration about a circumference of the rotor hub, the at least two rotor blades operatively coupled to the rotor hub via a blade grip, the blade grip rotatably coupled to a feathering shaft extending from the rotor hub; at least one pitch servo motor disposed near one end of the spine shaft, the at least one pitch servo motor comprising a servo arm; and a swashplate mechanism operatively coupling the at least one pitch servo motor to the blade grip, wherein operation of the swashplate mechanism adjusts a pitch angle of the at least two rotor blades.

Broadly stated, in some embodiments, the method can comprise mounting two of the at least one rotor system in a coaxial arrangement on the aerial vehicle.

Broadly stated, in some embodiments, the method can comprise mounting two of the at least one rotor system in a tandem arrangement on the aerial vehicle.

DETAILED DESCRIPTION OF EMBODIMENTS

Figure 1:
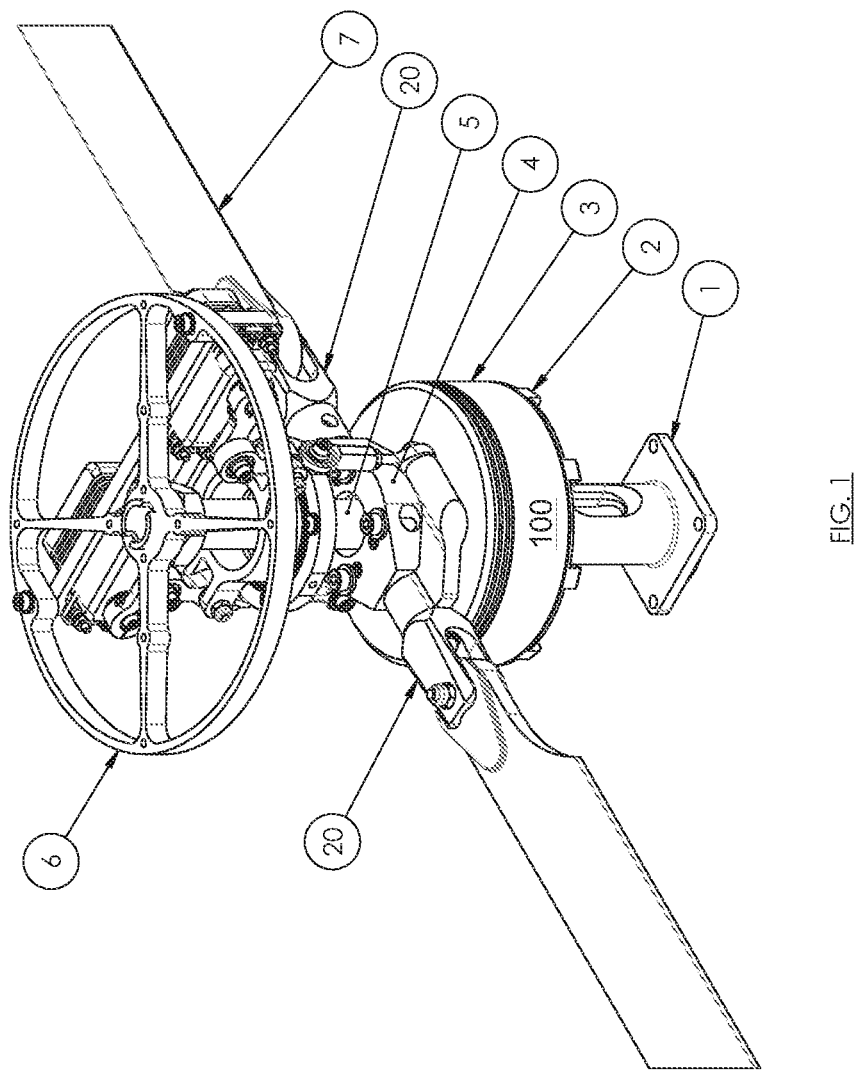
FIG. 1 is a perspective view depicting one embodiment of a rotor head for an aerial vehicle.
Figure 2:
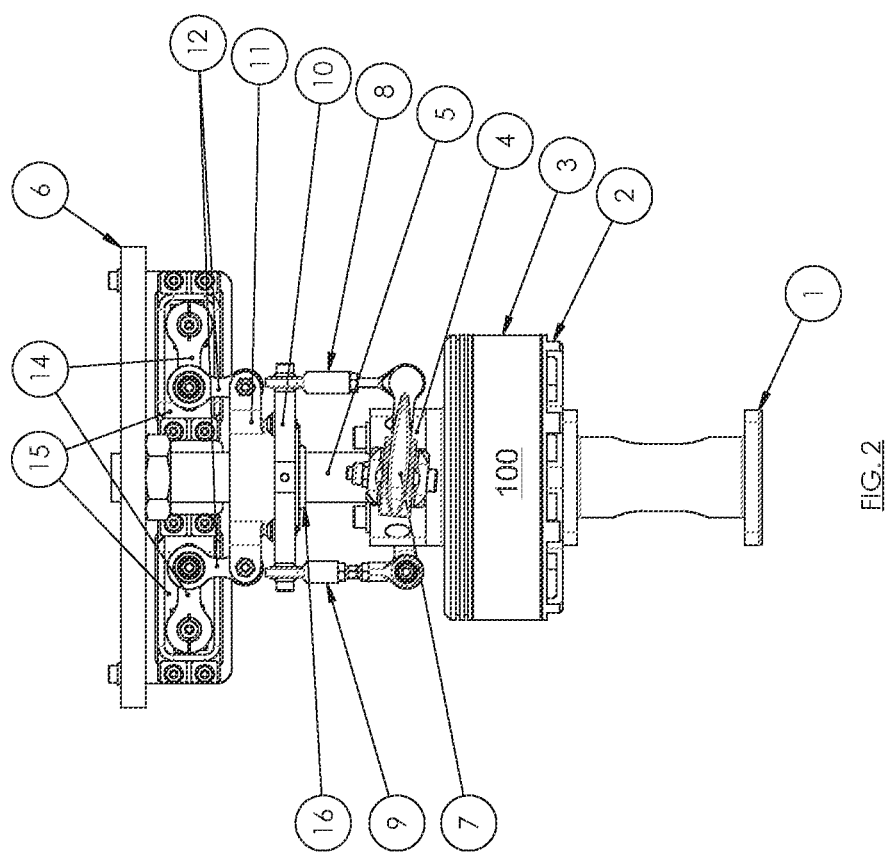
FIG. 2 is a side elevation view depicting the rotor head of FIG. 1.

In this description, references to one embodiment", an embodiment", or "embodiments" mean that the feature or features being referred to are included in at least one embodiment of the technology, Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

It may be useful for understanding of the rotor head to split the components up into "rotors" and "stators". Stators are fixed rotationally to the aerial vehicle, whereas rotors spin with the same speed as brushless direct current ("DC") motor 100, as shown in FIGS. 1 to 4.

Referring to the Figures, in some embodiments, the elements or features pertaining to "stators" can comprise":
Motor mount (1)
Motor stator (2)
Spine shaft (5)
Servo mount plate (6)
Servo motors (15)
Servo arms (14)
Swash links (12)
Swashplate stator (11)

Referring to the Figures, in some embodiments, the elements or features pertaining to "rotors" can comprise":
Motor rotor (3)
Rotor hub (4)
Feathering shaft (18)
Flapping pin (17)
Damper (19)
Blade grip (20), bearings (21), feathering shaft bolt (22)
Rotor blades (7)
Swashplate rotor (10)
Master pitch link (9)
Slave pitch link (8)

Figure 3:
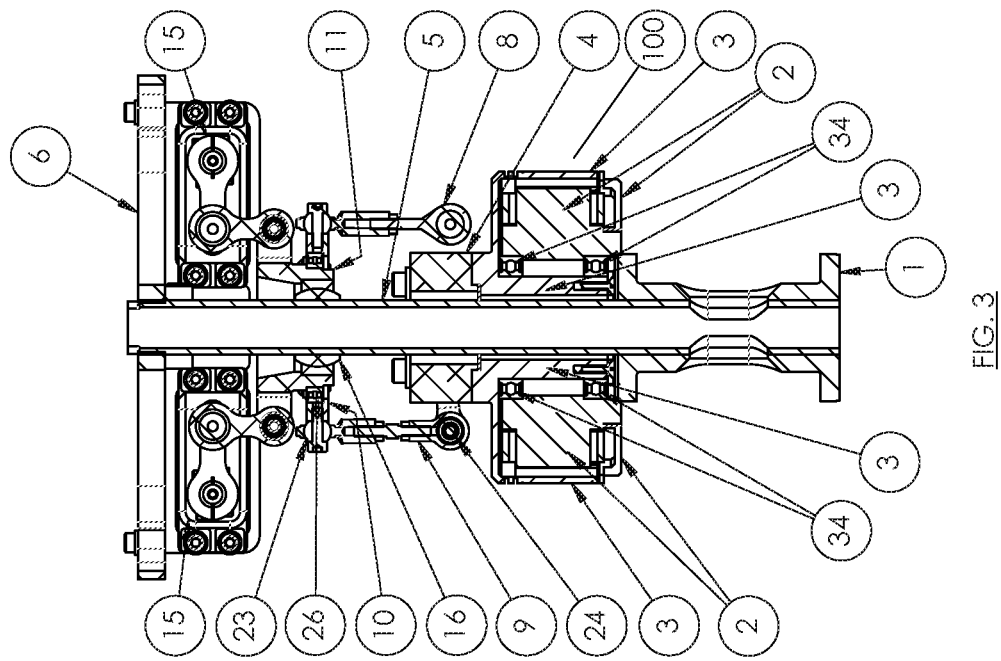
FIG. 3 is a side elevation cross-section view depicting the rotor head of FIG. 2.
Figure 4:
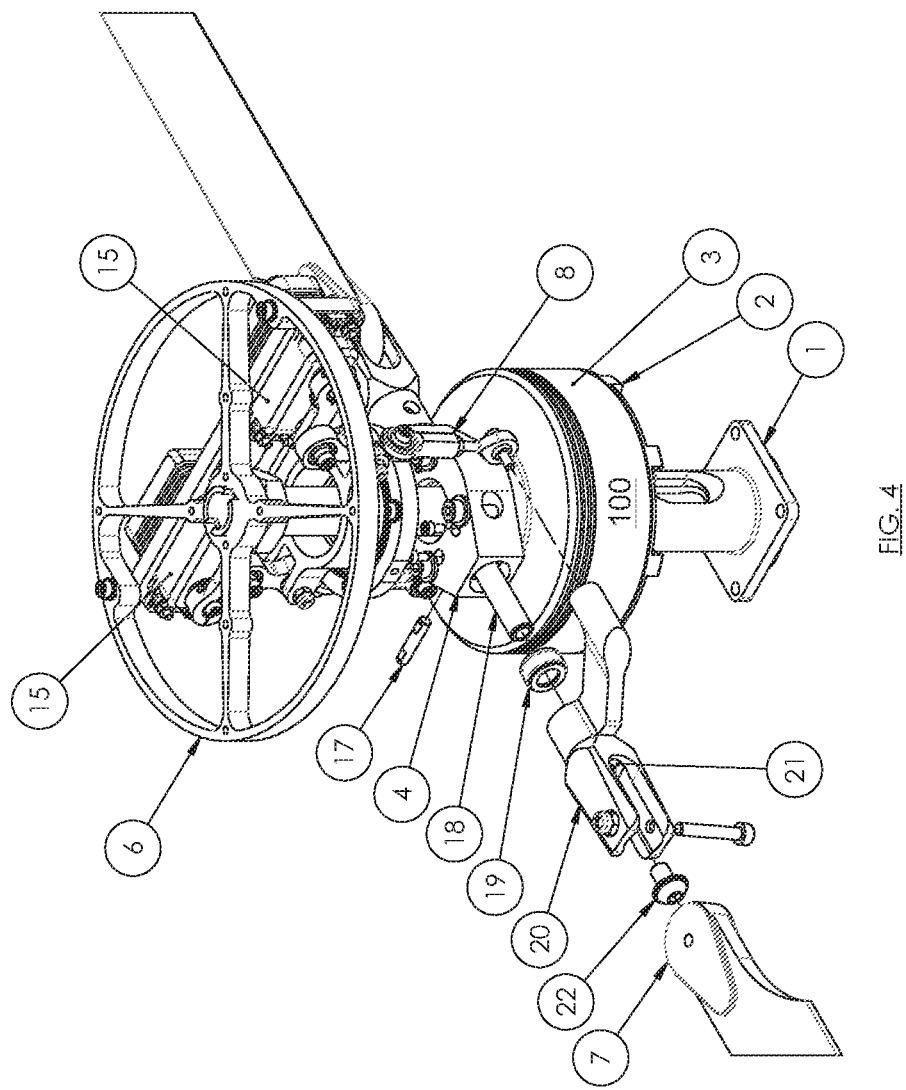
FIG. 4 is a partial exploded perspective view depicting the rotor head of FIG. 1.

Referring to FIGS. 1 to 6, in some embodiments, stator 2 of brushless DC motor 100 can be fastened to motor mount 1, which can be fixed to airframe of an aerial vehicle (not shown). Spine shaft 5 can also be fixed to motor mount 1. A through-bore in DC motor 100 can allow spine shaft 5 to pass through the DC motor 100. Servo mount plate 6 can be fixed to spine shaft 5. In some embodiments, rotor 3 of the brushless DC motor 100 can connect to rotor hub 4. As shown in FIG. 3, rotor 3 can be rotatably disposed on bearings 34 disposed between stator 2 and rotor 3 wherein rotor 3 can thereby rotate freely within and around stator 2 as well as rotate around spline shaft 5.

In some embodiments, feathering shaft 18 can be attached to rotor hub 4 via flapping pin 17 and can pivot about the axis of flapping pin 17. In some embodiments, flapping damper 19 can dampen the flapping movement of feathering shaft 18 about flapping pin 17.

In some embodiments, blade grip 20 can be mounted to feathering shaft 17 with bearing stack 21 and fastened in place with feathering shaft bolt 22. This can allow rotational movement of blade grip 20 about the axis of feathering shaft 18 but not translational axial movement. In some embodiments, each blade 7 can be bolted to blade grip 20.

In some embodiments, two servomotors 15 can be mounted to servo mount plate 6 and can provide electromechanical rotation to servo arms 14 about the output shafts of servomotors 15. In some embodiments, swashplate stator 11 can be attached to each servo arm 14 via one swash link 12 each.

In some embodiments, swashplate stator 11 can be mounted to spine shaft 5 using ball joint 16, the inner race of which can slide freely along spine shaft 5. Swashplate stator 11 can, therefore, translate along the axis of spine shaft 5 and rotate about the point of rotation of ball joint 16. In some embodiments, servo arms 14 and swash links 12 can further constrain the rotation of swashplate stator 11 to an axis parallel to the output axis of servomotor 15. By axial movement of the swashplate 11, collective pitch can be imparted to rotor blades 7. By rotational movement of the swashplate 11, cyclic pitch can be imparted in one direction (ie. pitch or roll).

In some embodiments, swashplate rotor 10 can be mounted to swashplate stator 11 using ball bearing 26. In some embodiments, master pitch link 9 can connect swashplate rotor 10 to one blade grip 20. This link can provide a driving torque from blade grip 20 to swashplate rotor 10 and can synchronize the position and speed of rotation between motor rotor 3 and swashplate rotor 10.

In some embodiments, a slave pitch link 8 can connect swashplate rotor 10 to the remaining blade grip 20. Slave pitch link 8 does not impart or receive any driving torque from either swashplate rotor 10 or blade grip 20.

Figure 5:
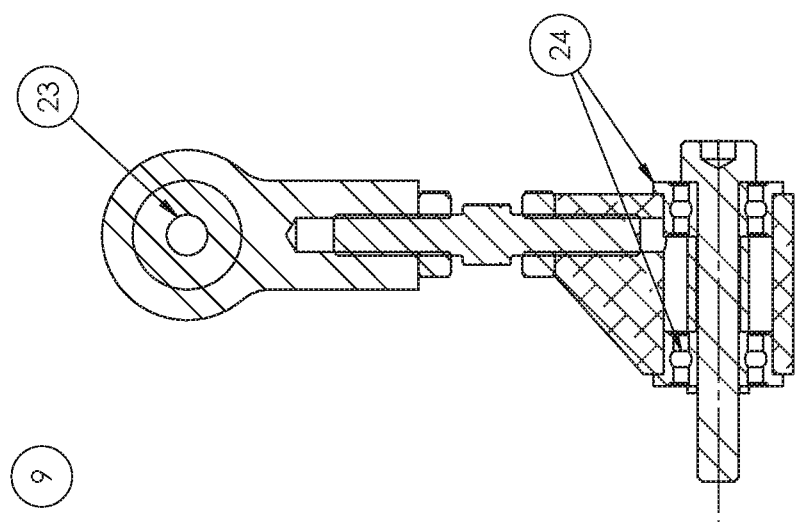
FIG. 5 is a side elevation cross-section view depicting a master pitch link of the rotor head of FIG. 2.

Referring to FIG. 5, in some embodiments, master pitch link 9 can comprise ball joint 23 and two flange ball bearings 24. Ball joint 23 can permit rotational movement about a point of rotation. Flange bearings 24 can restrict rotational movement to about the axis of the flange bearings. This allows a force to be imparted to master pitch link 9 in the direction of the axis of flange bearings 24.

Figure 6:
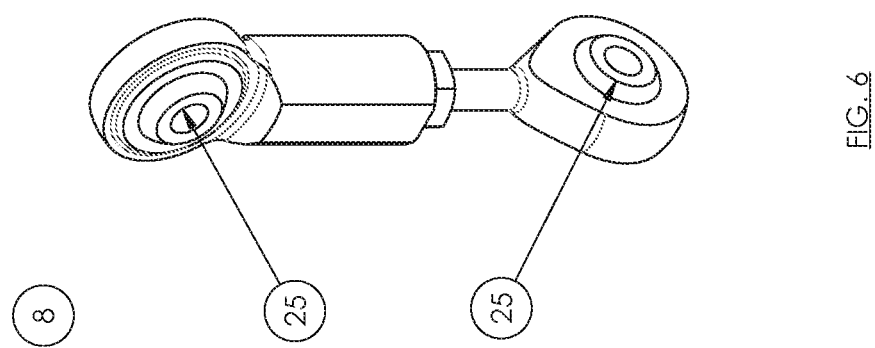
FIG. 6 is a perspective view depicting a slave pitch link of the rotor head of FIG. 2.

Referring to FIG. 6, in some embodiments, slave pitch link 8 can comprise two ball joints 25. This means that no lateral force can be applied to link 8 from either swashplate rotor 10 or blade grip 20.

The advantages of the master-slave pitch link arrangement are not immediately obvious. Consider a scenario where both pitch links are "master pitch link" design. In that scenario, any flapping of blade grip 20 about flapping pin 17 axis causes a rotational movement of the master pitch link about the flapping pin as well. This movement is transferred via the pitch link to swashplate rotor 10. If the magnitude of flapping of each blade grip is different (which occurs during cyclic pitch events) this introduces stress into all pitch link components. By replacing one of the master pitch links with a slave pitch link, the force cannot be transmitted from one blade grip to the other and, thus, no stress can be introduced into the system when blade flapping occurs.

Overview of a Coaxial System

Figure 7:
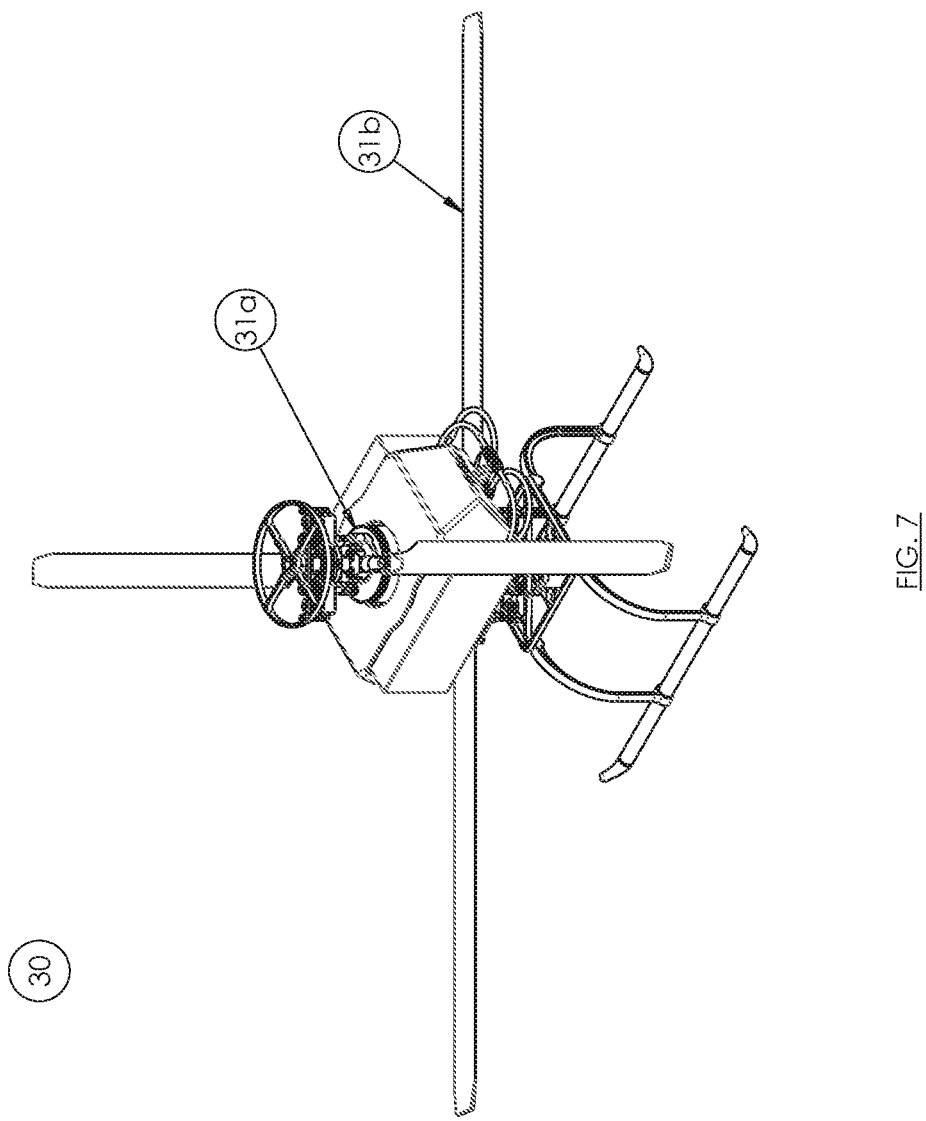
FIG. 7 is a perspective view depicting a coaxial helicopter comprising the rotor head of FIG. 1.

Referring to FIG. 7, one embodiment of a coaxial helicopter is shown. In this embodiment, coaxial helicopter 30 can be manufactured by mounting two rotor systems 31*a* and 31*b* thereon in a coaxial arrangement. While various configurations comprising two rotor systems can be employed, in all cases, one rotor system must rotate in a clockwise direction and the other rotor system must rotate in a counter clockwise direction. In some embodiments, one rotor system can control the roll direction cyclic pitch and the other rotor system can control the pitch direction cyclic pitch.

In some embodiments, altitude of helicopter 30 can be controlled by increasing or decreasing the collective pitch to both rotor systems 31*a* and 31*b*. In some embodiments, roll cyclic pitch on one of the rotor systems can control the roll of the aerial vehicle. In some embodiments, pitch cyclic pitch on the other rotor system can control the pitch of the aerial vehicle. In some embodiments, yawing the aerial vehicle can be accomplished by reducing the torque output of one motor while increasing torque of the other. In some embodiments, torque output of the motor can be modified by either changing speed of the rotor, changing collective pitch of the rotor or a combination of both.

Overview of a Tandem System

Figure 8:
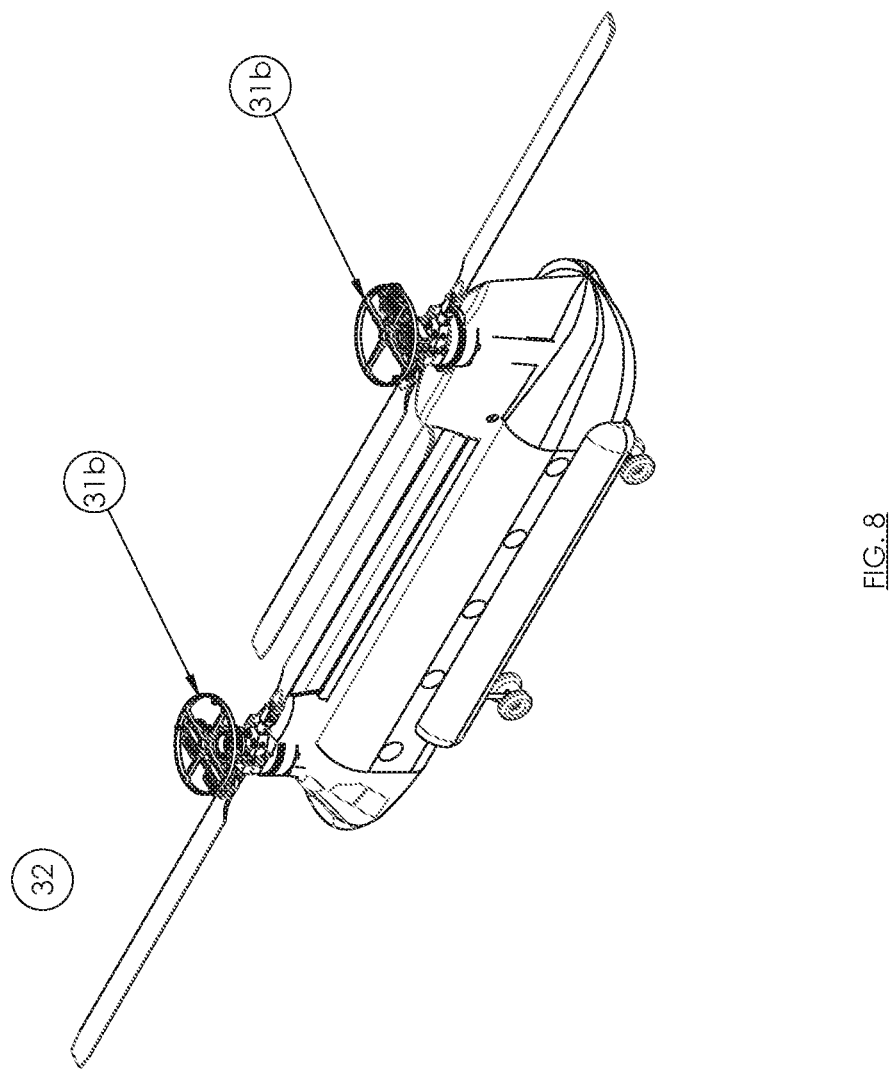
FIG. 8 is a perspective view depicting a tandem helicopter comprising the rotor head of FIG. 1.

Referring to FIG. 8, one embodiment of tandem helicopter system 32 is shown. In this embodiment, helicopter 32 can be manufactured by mounting two rotor systems 31*a* and 31*b* thereon in a tandem arrangement. The two rotor systems must rotate in opposite directions relative to each other. In this embodiment, cyclic pitch direction for the two rotor systems can be both in the roll axis of the aerial vehicle.

In some embodiments, altitude of helicopter 32 can be controlled by increasing or decreasing the collective pitch to both rotor systems 31*a* and 31*b*. In some embodiments, pitch of the aerial vehicle can be controlled by increasing the collective pitch on one rotor system and decreasing the collective pitch on the other. In some embodiments, roll control can be controlled by increasing or decreasing roll cyclic pitch on both rotor systems simultaneously and with equal magnitude. In some embodiments, yawing the aerial vehicle can be controlled by introducing roll cyclic pitch on one rotor system while introducing roll cyclic pitch of an equal magnitude but opposite direction on the other rotor system.

The various illustrative logical blocks, modules, circuits, and algorithm steps described in connection with the embodiments disclosed herein can be implemented as electronic hardware, computer software, or combinations of both, To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the embodiments described herein.

Embodiments implemented in computer software can be implemented in software, firmware, middleware, microcode, hardware description languages, or any combination thereof. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, etc.

The actual software code or specialized control hardware used to implement these systems and methods is not limiting of the embodiments described herein. Thus, the operation and behavior of the systems and methods were described without reference to the specific software code being understood that software and control hardware can be designed to implement the systems and methods based on the description herein.

When implemented in software, the functions can be stored as one or more instructions or code on a non-transitory computer-readable or processor-readable storage medium. The steps of a method or algorithm disclosed herein can be embodied in a processor-executable software module, which can reside on a computer-readable or processor-readable storage medium. A non-transitory computer-readable or processor-readable media includes both computer storage media and tangible storage media that facilitate transfer of a computer program from one place to another. A non-transitory processor-readable storage media can be any available media that can be accessed by a computer. By way of example, and not limitation, such non-transitory processor-readable media can comprise RAM, ROM, EEPROM, CD-ROM or other optical disk storage, magnetic disk storage or other magnetic storage devices, or any other tangible storage medium that can be used to store desired program code in the form of instructions or data structures and that can be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and/or instructions on a non-transitory processor-readable medium and/or computer-readable medium, which can be incorporated into a computer program product.

Although a few embodiments have been shown and described, it will be appreciated by those skilled in the art that various changes and modifications can be made to these embodiments without changing or departing from their scope, intent or functionality, The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A rotor system for an aerial vehicle, comprising:
   a) a motor mount configured for attaching to the aerial vehicle;
   b) a motor stator operatively coupled to the motor mount;
   c) a motor rotor rotatably disposed within the motor stator;
   d) a spine shaft operatively coupled to the motor mount;
   e) a rotor hub operatively coupled to the mount rotor;
   f) at least two rotor blades rotatably coupled to the rotor hub, the at least two rotor blades disposed in a spaced-apart configuration about a circumference of the rotor hub, the at least two rotor blades operatively coupled to the rotor hub via a blade grip, the blade grip rotatably coupled to a feathering shaft extending from the rotor hub, the feathering shaft rotatably attached to the rotor hub via a flapping pin;
   g) a flapping damper disposed between the feathering shaft and the rotor hub thereby dampening flapping movement of the feathering shaft about the flapping pin;
   h) at least one pitch servo motor disposed near one end of the spine shaft, the at least one pitch servo motor comprising a servo arm; and
   i) swashplate mechanism operatively coupling the at least one pitch servo motor to the blade grip, wherein operation of the swashplate mechanism adjusts a pitch angle of the at least two rotor blades.
2. The rotor system as set forth in claim 1, wherein the swashplate mechanism comprises:
   a) a swashplate stator circumferentially disposed around the spine shaft;
   b) a swash link operatively coupling the servo arm to the swashplate stator;
   c) a swashplate rotor rotatably circumferentially disposed around the swashplate stator; and
   d) a master pitch link operatively coupling the swashplate rotor to the blade grip of a first rotor blade of the at least two rotor blades.
3. The rotor system as set forth in claim 2, wherein the swashplate mechanism further comprises a slave pitch link operatively coupling the swashplate rotor to a second rotor blade of the at least two rotor blades.
4. An aerial vehicle comprising at least two rotor systems, wherein each of the at least two rotor systems comprises:
   a) a motor mount configured for attaching to the aerial vehicle;
   b) a motor stator operatively coupled to the motor mount;
   c) a motor rotor rotatably disposed within the motor stator;
   d) a spine shaft operatively coupled to the motor mount;
   e) a rotor hub operatively coupled to the motor rotor;
   f) at least two rotor blades rotatably coupled to the rotor hub, the at least two rotor blades disposed in a spaced-apart configuration about a circumference of the rotor hub, the at least two rotor blades operatively coupled to the rotor hub via a blade grip, the blade grip rotatably coupled to a feathering shaft extending from the rotor hub, the feathering shaft rotatably attached to the rotor hub via a flapping pin;
   g) a flapping damper disposed between the feathering shaft and the rotor hub thereby dampening flapping movement of the feathering shaft about the flapping pin;
   h) at least one pitch servo motor disposed near one end of the spine shaft, the at least one pitch servo motor comprising a servo arm; and
   i) a swashplate mechanism operatively coupling the at least one pitch servo motor to the blade grip, wherein operation of the swashplate mechanism adjusts a pitch angle of the at least two rotor blades.
5. The aerial vehicle as set forth in claim 4, wherein the swashplate mechanism comprises:
   a) a swashplate stator circumferentially disposed around the spine shaft;
   b) a swash link operatively coupling the servo arm to the swashplate stator;
   c) a swashplate rotor rotatably circumferentially disposed around the swashplate stator; and
   d) a master pitch link operatively coupling the swashplate rotor to the blade grip of a first rotor blade of the at least two rotor blades.
6. The aerial vehicle as set forth in claim 5, wherein the swashplate mechanism further comprises a slave pitch link operatively coupling the swashplate rotor to a second rotor blade of the at least two rotor blades.
7. The aerial vehicle as set forth in claim 4, wherein the at least two rotor systems are configured in a coaxial or tandem arrangement on the aerial vehicle.
8. A method for manufacturing an aerial vehicle, comprising:
   mounting at least one rotor system on the aerial vehicle, wherein each of the at least one rotor system comprises:
   a) a motor mount configured for attaching to the aerial vehicle;
   b) a motor stator operatively coupled to the motor mount;

c) a motor rotor rotatably disposed within the motor stator;
d) a spine shaft operatively coupled to the motor mount;
e) a rotor hub operatively coupled to the motor rotor;
f) at least two rotor blades rotatably coupled to the rotor hub, the at least two rotor blades disposed in a spaced-apart configuration about a circumference of the rotor hub, the at least two rotor blades operatively coupled to the rotor hub via a blade grip, the blade grip rotatably coupled to a feathering shaft extending from the rotor hub, the feathering shaft rotatably attached to the rotor hub via a flapping pin;
g) a flapping damper disposed between the feathering shaft and the rotor hub thereby dampening flapping movement of the feathering shaft about the flapping pin;
h) at least one pitch servo motor disposed near one end of the spine shaft, the at least one pitch servo motor comprising a servo arm; and
i) a swashplate mechanism operatively coupling the at least one pitch servo motor to the blade grip, wherein operation of the swashplate mechanism adjusts a pitch angle of the at least two rotor blades.

9. The method as set forth in claim 8, wherein the swashplate mechanism comprises:
a) a swashplate stator circumferentially disposed around the spine shaft;
b) a swash link operatively coupling the servo arm to the swashplate stator;
c) a swashplate rotor rotatably circumferentially disposed around the swashplate stator; and
d) a master pitch link operatively coupling the swashplate rotor to the blade grip of a first rotor blade of the at least two rotor blades.

10. The method as set forth in claim 9, wherein the swashplate mechanism further comprises a slave pitch link operatively coupling the swashplate rotor to a second rotor blade of the at least two rotor blades.

11. The method as set forth in claim 8, further comprising mounting two of the at least one rotor system in a coaxial arrangement on the aerial vehicle.

12. The method as set forth in claim 8, further comprising mounting two of the at least one rotor system in a tandem arrangement on the aerial vehicle.

\* \* \* \* \*